United States Patent
Oumi

[19]

[11] Patent Number: 6,134,501
[45] Date of Patent: Oct. 17, 2000

[54] VEHICLE TRAVEL-ROUTE GUIDANCE APPARATUS WITH INTERNAL INTERSECTION DISCOUNT FEATURE

[75] Inventor: Masanori Oumi, Gifu, Japan

[73] Assignee: DENSO Corporation, Kariya, Japan

[21] Appl. No.: 09/144,331

[22] Filed: Aug. 31, 1998

[30] Foreign Application Priority Data

Aug. 29, 1997 [JP] Japan .................................. 9-234968

[51] Int. Cl.[7] .............................................. G06F 165/00
[52] U.S. Cl. ......................... 701/209; 701/201; 701/210
[58] Field of Search .................................. 701/209, 201, 701/202, 204, 210, 211; 340/990, 995

[56] References Cited

U.S. PATENT DOCUMENTS

| 4,737,927 | 4/1988 | Hanabusa et al. | 701/200 |
|---|---|---|---|
| 5,862,509 | 1/1999 | Desai et al. | 701/209 |
| 6,018,697 | 1/2000 | Morimoto et al. | 701/209 |

FOREIGN PATENT DOCUMENTS

| 5-053500 | 3/1993 | Japan . |
|---|---|---|
| 7-192193 | 7/1995 | Japan . |
| 8-136277 | 5/1996 | Japan . |
| 9-042984 | 2/1997 | Japan . |

Primary Examiner—Tan Nguyen
Attorney, Agent, or Firm—Pillsbury Madison & Sutro LLP

[57] ABSTRACT

A vehicle travel-route guidance apparatus. The apparatus includes a map-storing device having internal intersection information that is furnished for executing a right-hand turn or a left-hand turn to bypass an intersection. The guidance apparatus further includes a device that determines whether searched links or nodes have internal intersection information associated therewith, either during, or after, link/node cost evaluation during a destination route search by the control unit. The guidance apparatus also includes a device for relatively changing an evaluation value of the link/node to preferentially include the link/node in a destination route when the control unit searches for a destination route by evaluation-value calculation, thereby ensuring that the most desirable destination route is chosen.

16 Claims, 6 Drawing Sheets

FIG. 8

VEHICLE TRAVEL-ROUTE GUIDANCE APPARATUS WITH INTERNAL INTERSECTION DISCOUNT FEATURE

BACKGROUND OF THE INVENTION

1. Technical Field

This invention relates to a vehicle travel-route guidance apparatus and associated map-data recording medium that establish a route from a departure site to a destination based on map node and link information, and that perform travel guidance in accordance with this established route. More particularly, this invention relates to a vehicle travel-route guidance apparatus and an associated map-data recording medium thereof that establish a bypass route that passes through an intersection point when such a bypass route exists in a searched destination route.

2. Related Art

A conventional travel-route guidance apparatus for vehicle use sets a route from a departure site to a destination, and performs travel guidance to the destination by highlighting the route on a road map, or by giving vocal instructions as to the direction in which the vehicle should proceed.

Such a vehicle travel-route guidance apparatus typically displays a map on a display screen by dividing several roads on a map into a plurality of nodes. The nodes are made up of an intersection point, a branch point, a union point, or the like, to thereby define the respective node intervals as a series of connected links. Information relating to the foregoing several nodes and to the several links is stored as map data in a storage medium such as a CD-ROM or the like.

Accordingly, when setting a destination route, the travel-route guidance apparatus reads map data from the storage medium, searches for a route from a departure site to the set destination, and sets an optimal route. The route setting is performed by evaluation and calculation based on node and link information, such as cost calculation according to the well-known Dijkstra algorithm, which sets the lowest-cost route as the destination route.

Figure 7:
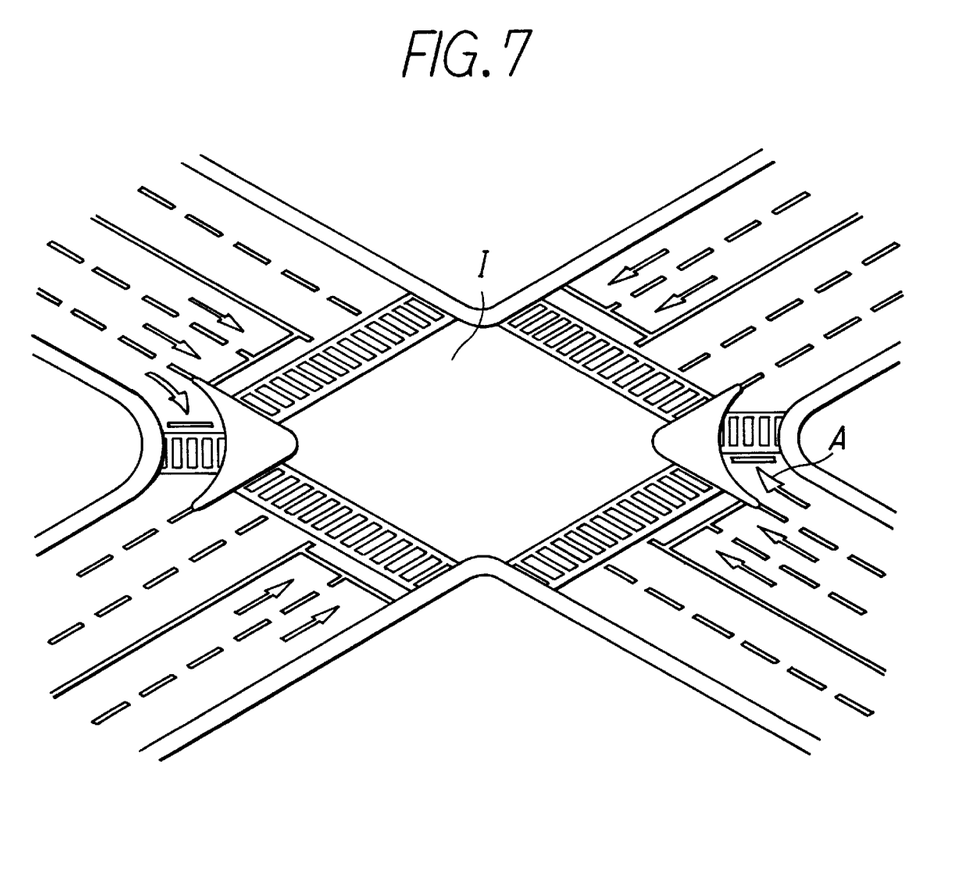
FIG. 7 is a perspective view of an intersection portion having a bypass.
Figure 8:
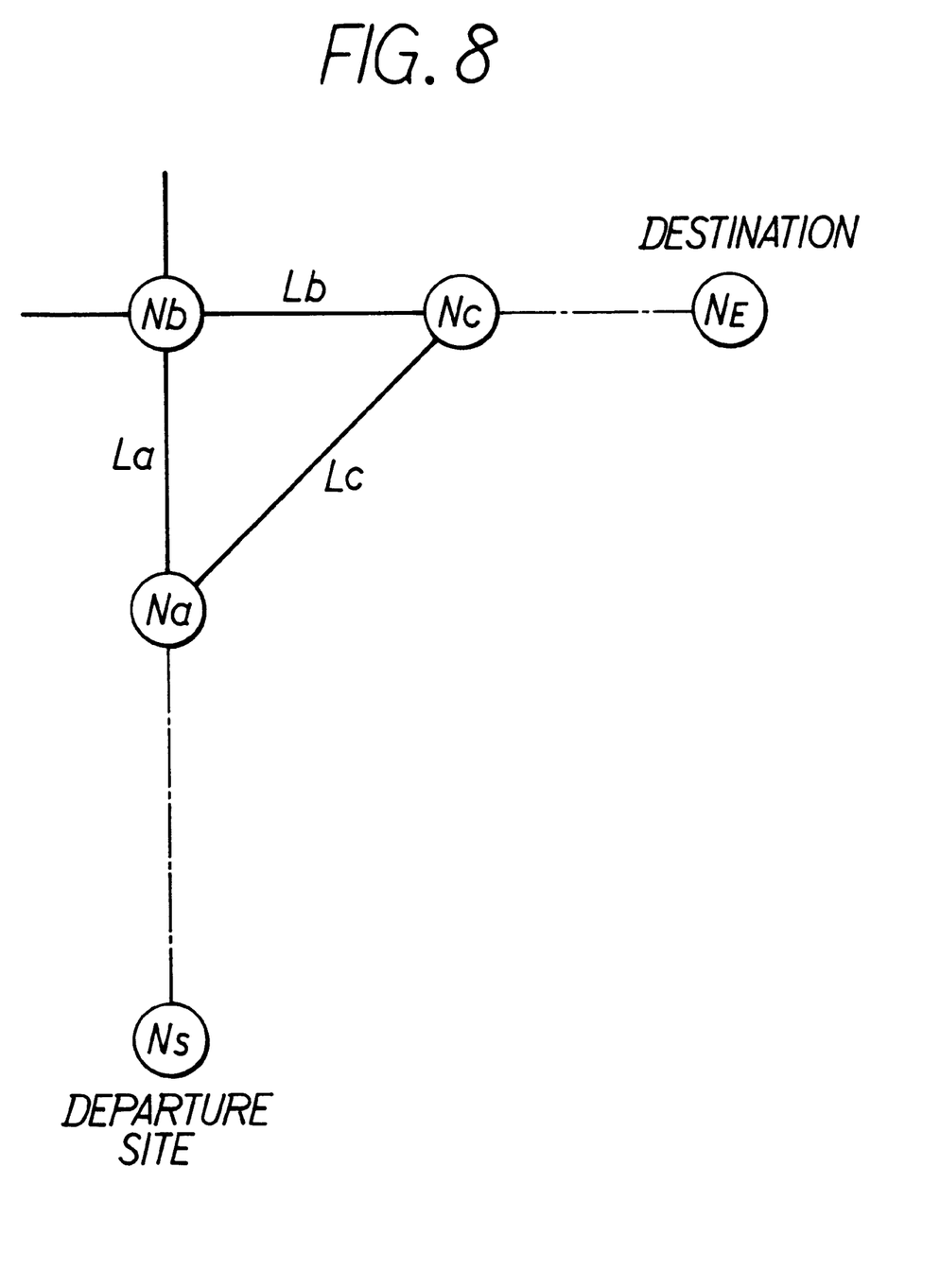
FIG. 8 corresponds to FIG. 2, and describes a search of destination routes in an internal intersection according to related art.

Traffic signals are generally installed at the intersections of major roads, and vehicles travel in accordance with these traffic signals. As shown in FIG. 7, however, many intersections include a bypass route A just before an intersection I, thus permitting a right- or left-hand turn prior to the traffic signal. FIG. 7 depicts a region where traffic flow on the right is the observed. Hereinafter, such a bypass just before an intersection will be termed an internal intersection. FIG. 8 is a structural view of nodes and links in the vicinity of this intersection I with the bypass A; Nb indicates the intersection I, and Lc indicates the internal intersection A.

Meanwhile, conventionally, when the apparatus searches for a destination route, it determines the cost of a node based on the road width of the intersection, the angle of the right-/or left-hand turn, and so on. The apparatus determines the cost of a link by link length (road length), road width, and so on. For link length, actual road length is measured, rounded off, and recorded in the link information. For this reason, in a case where link length at an internal intersection is rounded off, among the routes from node Na to node Nc, the total link length of links La and Lb, which are routes passing through the node Nb depicting the interior of the intersection, and the length of a link Lc which is the internal intersection, are substantially equal. In addition, whereas there is one right-hand turn on the route passing through the intersection node Nb, there are two right-hand turns when the route passes through the link Lc, which is the internal intersection. Because of this, the cost of right-hand turns passing through the internal intersection may become high. In such a case, the route making a right-hand turn and passing through the intersection I without passing through the internal intersection A may be selected.

However, even though there is a route that always permits a right-hand turn regardless of the traffic signal condition, this route cannot be set. Therefore, the apparatus provides guidance that is counter to the driver's intentions.

SUMMARY OF THE INVENTION

In view of the foregoing circumstances, it is an object of this invention to provide a vehicle travel-route guidance apparatus and a map-data recording medium thereof which can set a route passing through an internal intersection as a destination route when an intersection having an internal intersection exists among searched routes.

To achieve this object, a vehicle travel-route guidance apparatus is provided according to a preferred embodiment of the present invention. The apparatus includes a map-storing device having internal intersection information that is furnished for executing a right-hand turn or a left-hand turn to bypass an intersection. The guidance apparatus further includes a device that determines whether searched map data, including link and node information, have internal intersection information associated therewith, either during, or after, map data cost evaluation during a destination route search by the control unit. The guidance apparatus also includes a device for relatively changing an evaluation value of the map data to preferentially include the map data in a destination route when the control unit searches for a destination route by evaluation-value calculation.

As used above, and throughout the specification, the term "relatively changing an evaluation value" includes, in addition to cases where the evaluation value of a link/node indicating an internal intersection is changed, cases where the evaluation value of this link/node remains unchanged and the evaluation value of another is changed.

DETAILED DESCRIPTION OF THE INVENTION

A first embodiment of this invention will be described hereinafter with reference to FIGS. 1–5.

Figure 3:
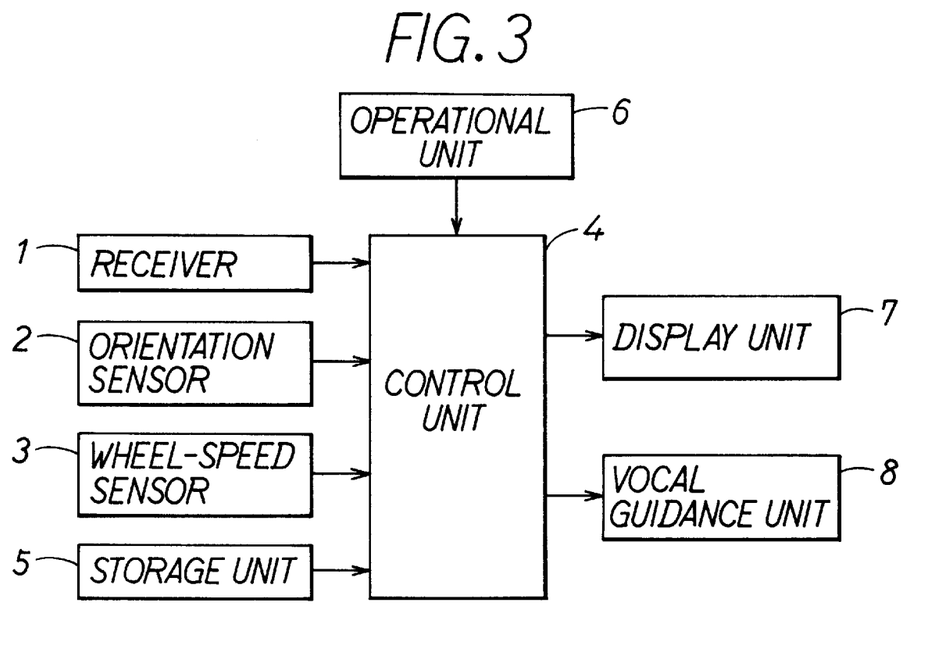
FIG. 3 is a block diagram indicating the overall structure of the present invention.

Referring first to FIG. 3, a travel-route guidance apparatus for vehicle use is provided with a GPS (global positioning system) receiver 1, an orientation sensor 2 and a wheel-speed sensor 3 as a present-position detecting unit to detect the present position of a vehicle. The GPS receiver 1 receives radio waves from a satellite and generates a signal indicating the present position of the vehicle. The orientation sensor 2 generates a direction signal after detecting a travelling direction of the vehicle via, for example, earth magnetism. The wheel-speed sensor 3 generates a distance signal after detecting vehicle traveled distance based on a rotational speed of vehicle wheels. Output signals of this GPS receiver 1, orientation sensor 2, and wheel-speed sensor 3 are furnished to a control unit 4.

A storage unit 5 is connected to the control unit 4. The storage unit 5 functions as a map-storing unit and includes a storage medium such as a hard disk, CD-ROM, DVD-ROM, or the like whereon map data is stored, and provides the map data or the like to the control unit 4. Voice data for generating vocal guidance is also stored in the storage unit 5.

An operation unit 6 includes a wireless remote-control unit, tactile switches or the like directly contacting a key switch or a display screen of a display unit 7. The destination and through-points can be input to the control unit 4 using the operation unit 6 by pointing to a position on a screen of the display unit 7, or by entering an identification number representative of the position, such as the telephone number of the destination. When searching destination routes, the departure site is ordinarily the present position of the vehicle, but in a case where a position different from the present position is to be set as the departure site, the operation unit 6 can be used to set the desired departure site.

The display unit 7 is provided on an instrument-panel portion of the vehicle and displays the road map, the present position, and the like. An LCD (liquid-crystal display) unit, a CRT (cathode-ray tube) display unit, or the like can be used for the display unit 7.

The control unit 4 includes a computer, and, preferably in this embodiment, a microprocessor. The control unit displays a road map of the vehicle travel area on the display unit 7 based on signals from the GPS receiver 1, the orientation sensor 2, the wheel-speed sensor 3, and the operation unit 6. The control unit also executes processing to display the present position of the vehicle on the road map.

The control unit 4 functions also as a route-setting device. When a departure site and a destination are specified, the control unit 4 searches for the optimal route therebetween. When performing route guidance for the destination, the control unit 4 highlights the destination route on the display unit 7, and generates guidance voice data for proceeding along the destination route at a vocal guidance unit 8. The vocal guidance unit is a route-guiding device that, together with the display unit 7, provides guidance on a right- or left-hand turn with predetermined timing before reaching, for example, a point at which such a turn is to be made.

Map data stored on a storage medium such as a hard disk, CD-ROM, DVD-ROM, or the like will be described hereinafter.

Figure 4:
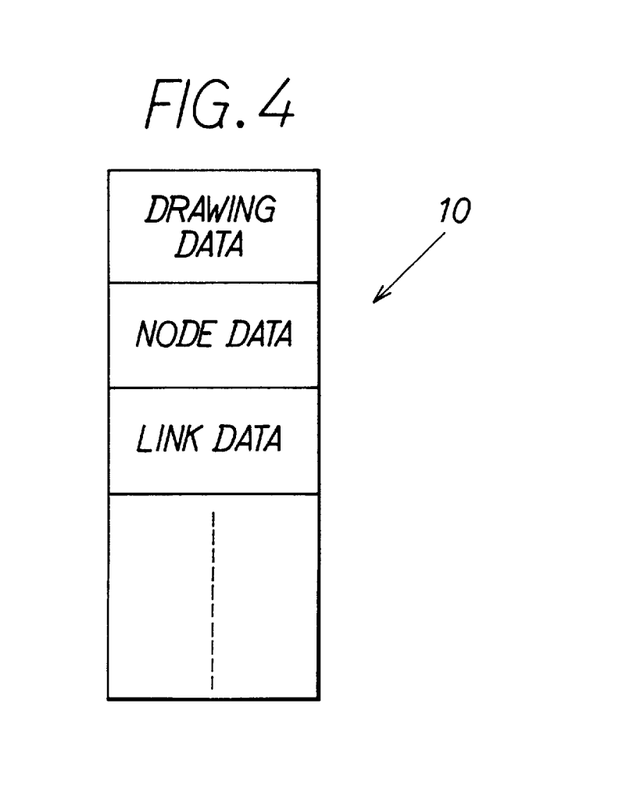
FIG. 4 shows map data structure.

As shown at 10 in FIG. 4, the map data is provided with drawing data, route data, index data, and the like.

Drawing data is for displaying the road map on the screen of the display unit 7, and includes node information and link information. By dividing the several roads on the road map into a plurality of nodes representing bend points of intersections, branch points, union points, curves of a predetermined angle or more, and the like, the intervals between the respective nodes can be defined as links, and the links can then be connected.

Each node includes data indicating a unique identifying number (node ID) therefor, coordinates, and a node attribute, for example a three-dimensional intersection or a multiple-lane intersection, and so on.

Each link includes data and the like indicating a unique identifying number (link ID) therefor, coordinates of a start point and an end point, a link angle for particular direction (for example north), road width, and road type (expressway, national road, local road, or the like), as well as data relating to a link attribute, such as the number of vehicle lanes of the road, or restrictions such as a one-way road indication, an internal intersection, or the like.

Index data is for indexing the position when the departure site and the destination have been entered as a geographical name, building name, telephone number, or the like. The index data includes data relating the geographical name, building name, telephone number, and so on to coordinates on a road map corresponding thereto. Accordingly, when a geographical name, building name, telephone number, or the like has been specified by the operation unit 6, the control unit 4 detects the coordinates of this site from the index data and displays the coordinates on the road map of the display unit 7.

Meanwhile, route data is employed in setting a destination route, and includes node information, link information, and network information. The node information in the route data is provided with data indicating an ID thereof, and a node attribute, such as a three-dimensional intersection or a multiple-lane intersection, for each above-described node.

Figure 5:
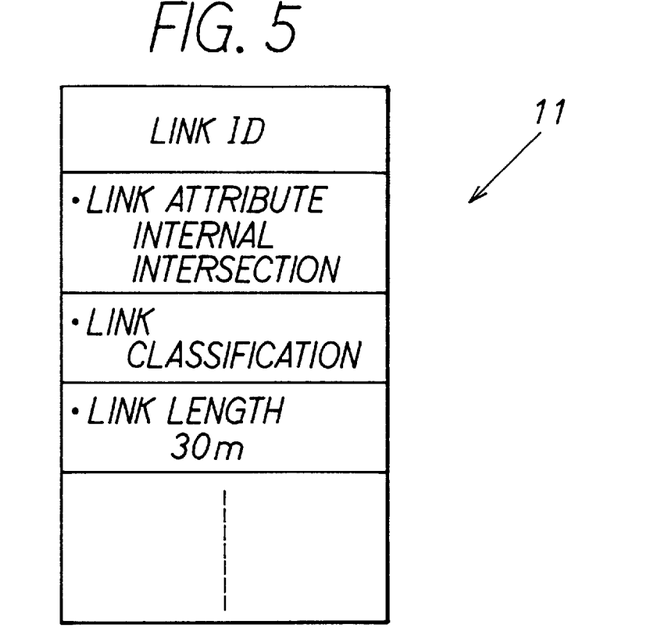
FIG. 5 shows the structure of link information.

As shown at 11 in FIG. 5, link information in the route data includes data required for cost calculation, such as a link ID, a link attribute, link type, link length, and so on for each link. The link attribute indicates the type of the present link, such as, for example, when the link is an internal intersection (indicated as "internal intersection" in FIG. 5). The link type is data indicating the type of road. The link length is data indicating the length of the road represented by the link. Network information is information about how links are connected to the respective nodes, such as for example data indicating that links B, C, D, and E are connected to node A.

When displaying a road map, the control unit 4 accesses the storage unit 5 and reads the drawing data from a temporary storage unit, for example a RAM, with which the control unit 4 is provided. The control unit 4 uses this drawing data to specify, for each road, a link ID array and a node ID array of the interval thereof from the node IDs of the start point and end point of the road. The control unit 4 displays the road map on the screen of the display unit 7 by extracting the coordinates of the nodes and links on the several roads from the node information, and the link information of the drawing data based on these link IDs and node IDs, and interconnecting and displaying these extracted coordinate points in accordance with the node and link attributes.

When setting a destination route, the control unit 4 accesses the storage unit 5 and reads the route data from the RAM. The control unit 4 uses the network information in the route data to sequentially search for a route from the departure site leading to the destination, repeats operation to select a route according to calculation of an evaluation value from a plurality of searched routes, for example cost calculation using the Dijkstra algorithm, and ultimately sets an optimal route from the departure site to the destination as the destination route.

This destination route is specified as node IDs and a link ID array from the departure site to the destination. Based on these node IDs and link ID array, the node information and the link information in the drawing data is accessed. The nodes and links set as the destination route are highlighted on the road map and displayed on the display unit 7.

The cost of the several nodes and the cost of the several links of the routes during the above-described search of the destination route is determined through calculation based on the node information and the link information in the route data. This cost is stored in the RAM of the control unit 4.

Node cost is determined by multiplying a predetermined value by coefficients corresponding to road type, road width, angle of right-/left-hand turn, or the like for the respective cases of proceeding straight through a node, making a right-hand turn through a node, and making a left-hand turn through a node.

Link cost is calculated using the following equation.

Link Cost=Link Length×Road Width Coefficient×Road Type Coefficient

Here, the road-width coefficient and the road-type coefficient are each set to a predetermined value according to the road width and road type acquire from the link data by the control unit 4.

In calculating the link cost, the control unit 4 determines from the link information in the route data whether the attribute of the link is an internal intersection. When an internal intersection is detected, the control unit 4 stores the value calculated with the foregoing equation in the RAM as the cost for this link. When the link is determined to be an internal intersection, the control unit 4 multiplies the value calculated with the foregoing equation by a predetermined coefficient that is less than 1, and takes this to be the cost for the link. Due to this, the link cost representing the internal intersection is made lower than the link cost in a case where the link is assumed not to be an internal intersection, and is stored in the RAM.

The node cost and the link cost stored in the RAM as was described above are read when the control unit 4 selects one route from among a plurality of routes, and the route having the smallest total cost is selected.

Figure 1:
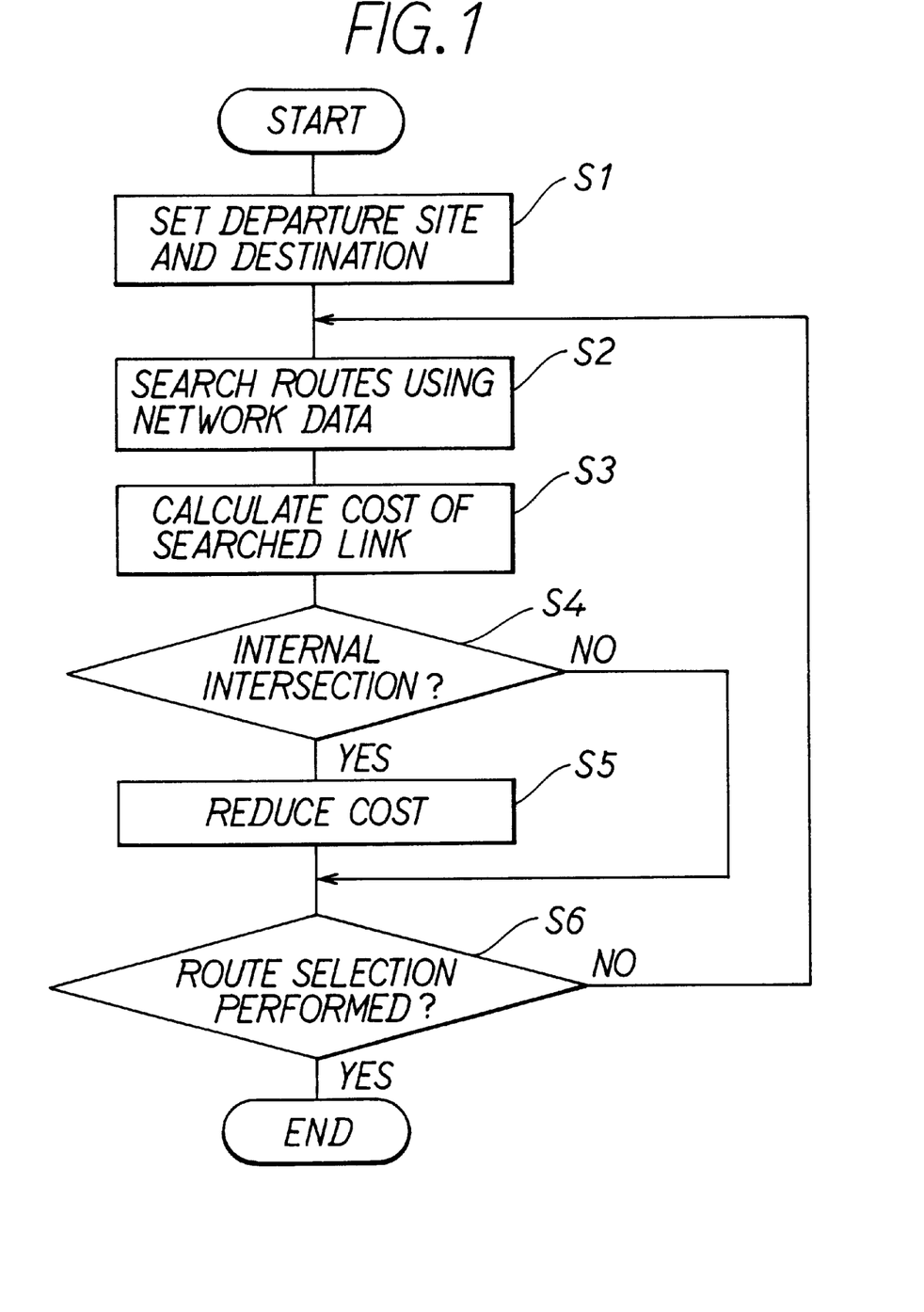
FIG. 1 depicts a first embodiment of this invention, and is a flow diagram of the content of control for cost change during a destination-route search.

The details of the control by the control unit 4 during this route search will be described hereinafter with reference to the flow diagram of FIG. 1, centering chiefly on a case of link calculation.

When the departure site (in this example, the present site) and the destination are set through operation of the operation unit 6 by the user (step S1), the control unit 4 sequentially searches the routes from the departure site leading to the destination using the network data of the map data of the storage unit 5 (step S2), and calculates the cost of the searched link (step S3).

Thereafter, the control unit 4 determines from the link information in the route data whether the searched link is an internal intersection (step S4). When the searched link is not an internal intersection ("No" in step S4), the control unit 4 stores the value calculated in step S3 in the RAM as the cost for this link.

When the searched link is an internal intersection ("Yes" in step S4), the control unit 4 multiplies the value calculated in step S3 by a fixed coefficient which is less than 1, for example, 0.5, to reduce the cost (step S5), and stores the new reduced cost in the RAM as the cost for the link.

Accordingly, the control unit 4 performs a cost calculation by reading the costs of the nodes and the links for the respective plurality of searched routes from the RAM, determining the sums of these costs, and selecting the route having the lowest sum cost as the destination route.

Next, the control unit 4 determines whether the route selection from the departure site to the destination according to the above-described comparison of sum cost has been performed and the route search has ended (step S6). In a case where the route search has not ended ("No" in step S6), execution returns to step S2, and a route search from the site selected as the destination route is again performed, and link cost is calculated. Accordingly, when the route search from the departure site to the destination ends ("Yes" in step S6), the destination-route setting mode ends.

Figure 2:
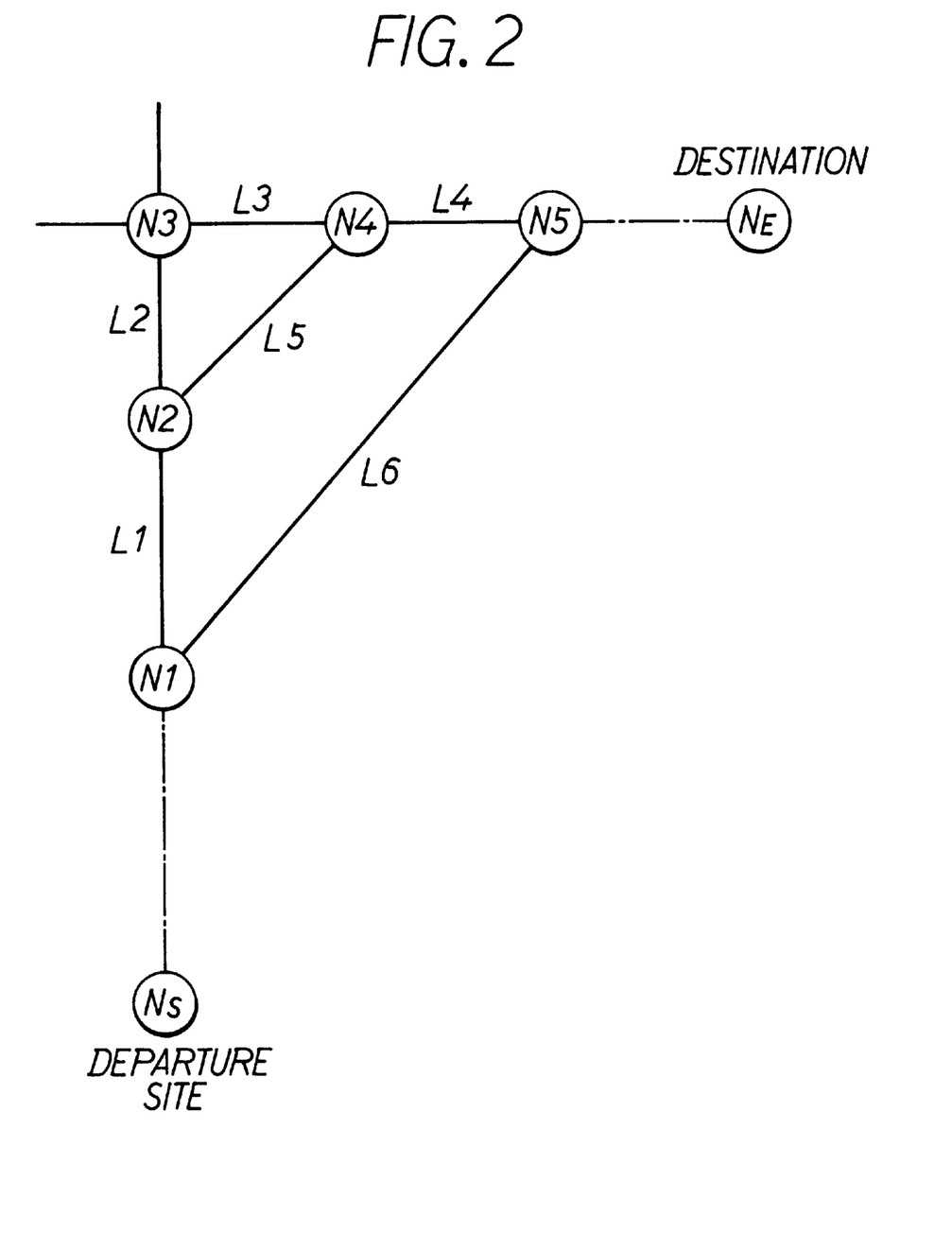
FIG. 2 is a drawing indicating a link array for describing a search of destination routes through cost calculation.

A route search according to cost calculation as was described above will be described in specific terms, taking the internal intersection shown in FIG. 2 as an example. It is assumed at this time that a route leading to a node N2 through a link L1 has been selected. Here, in FIG. 2, links L1 and L2 indicate a straight road leading to an intersection, links L3 and L4 indicate a straight road leading to a destination after a right-hand turn at an intersection, and link L5 indicates an internal intersection. The node N2 indicates a branch point of the links L2 and L5, node N3 indicates an intersection, and node N4 indicates a union point of the links L5 and L3.

Let it be assumed that the control unit 4 has searched node N2→link L2→node N3→link L3→node N4 (a route passage through the intersection) and node N2→ link L5→ node N4 (a route passage through the internal intersection) as the routes from the node N2 to the node N4.

The control unit 4 calculates the costs of the respective nodes and links for these two searched routes via a cost evaluation. In this case, the costs of the links L2, L3, and L5 obtained by ordinary cost calculation without taking the link attributes into consideration are assumed to be 50, 50, and 100, and the costs obtained by ordinary cost calculation in a case of a right-hand turn at the node N2 from the link L1 leading to the link L5, in a case of a right-hand turn at the node N3 from the link L2 leading to the link L3, and in a case of a right-hand turn at the node N4 from the link L5 leading to the link L4 are each assumed to be 20.

Here, after the control unit 4 has calculated the cost of the link L5 as 100 according to ordinary cost evaluation, the control unit 4 determines the link L5 to be an internal intersection according to the attribute information for the link L5, and multiplies the cost 100 by the 0.5 to determine a cost of 50 as the cost of the link L5.

Thereafter, the control unit 4 performs cost calculation for the two routes and selects the lower-cost route as the destination route. Here, the cost from the node N2 to the node N4 in the case of the route through the intersection is 50+20+50=120, and the cost of the latter route through the internal intersection is 20+50+20=90. Consequently, the control unit 4 selects the lower-cost route according to the result of cost calculation as the destination route.

In this connection, it may be noted that there may be cases where a route through the link L4 to the node N5 and a route from the node N1 through the link L6 to the node N5 exist as routes leading to the next node N5. At this time, one of the routes is selected according to comparison of the sum of costs for the two routes. At this time, when the cost of the internal intersection is set at 0, the route of N1→L1→N2→L5→N4 is selected according to the results of the above-described cost calculation. In this case, a problem occurs wherein the cost of the route which does not pass through the link L6 becomes lower even though the distance of the route through the link L6 is shorter and more advantageous for vehicle travel. To prevent this problem to the greatest extent possible, the cost of an internal intersection is not set at 0.

In the above-described embodiment, to ensure selection of the internal intersection, the cost of the internal intersection is set lower than the cost determined by ordinary cost calculation. However, it is also acceptable to make the cost of the right-hand turn relatively lower by conversely keeping the cost of the internal intersection unchanged at the cost determined by ordinary cost calculation, and making the right- and left-hand turn costs of other links and nodes higher than the cost determined by ordinary cost calculation.

In the foregoing embodiment, when the control unit 4 searches for routes by using the network information, the control unit 4 performs cost calculation for a link, determines whether the link is an internal intersection, and, when the link is an internal intersection, performs computation to change the cost thereof. However, it is also acceptable to employ a structure wherein when the route data has been read from the storage unit 5, or, after reading the route data, the data for calculating link cost for the link making up the internal intersection is made to change during the interval until the start of the route search, so that the cost of the internal intersection is made low when actually calculating the cost of this link.

When such a structure is employed, it is sufficient not to determine whether a link is an internal intersection when calculating the link cost during a route search. Therefore, processing is simplified.

Also, with the foregoing embodiment, when the searched route is an internal intersection, the internal intersection is selected as the destination route by changing the cost of the searched route. However, it is also acceptable to utilize a structure wherein the internal intersection is selected by allowing the cost of the internal intersection to remain unchanged at the initially furnished value, and instead changing the right-hand turn cost of the node entering the internal intersection and of the node leaving the internal intersection so as to become lower than the cost determined by the ordinary calculation.

Additionally, a structure may be utilized wherein in addition to the cost of the internal intersection, the internal intersection is selected by changing the right-hand turn cost of the node entering the internal intersection and the right-hand turn cost of the node leaving the internal intersection so as to become lower than the cost determined by the ordinary calculation.

Figure 6:
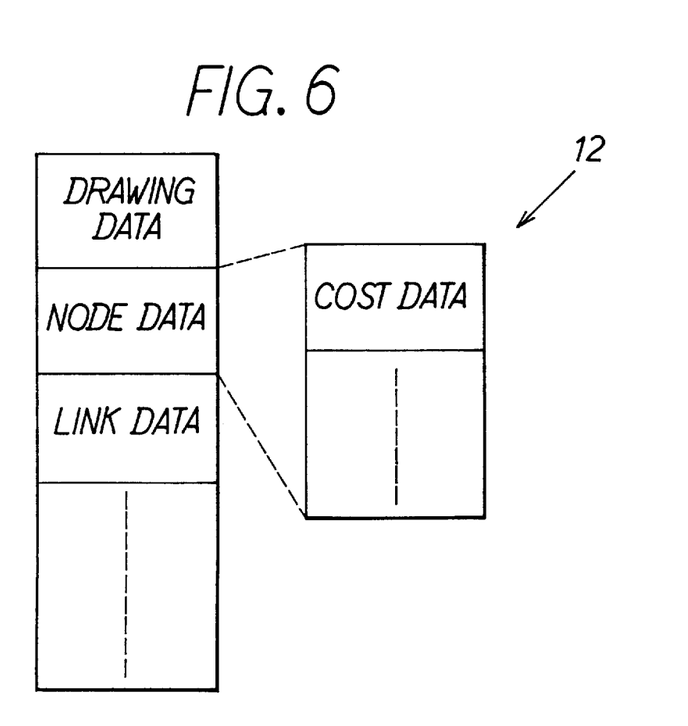
FIG. 6 corresponds to FIG. 5, and depicts another embodiment of the present invention.

Further, in the data stored in the storage medium, the route data may be made to include a cost-data portion as evaluation-value information in addition to the node information, link information, and network information, as in another embodiment of the present invention shown at 12 in FIG. 6. Node costs as evaluation values relating to nodes and, similarly, link costs as evaluation values relating to links may be stored in this cost-data portion. Accordingly, when a link is an internal intersection, the cost of this link may be set at a cost lower than the cost ordinarily furnished when the link is assumed not to be an internal intersection. For example, for node cost, the cost may be determined by a parameter such as the associated turning angle. For link cost, the cost may be determined by link length, width and kind.

In a case where the storage medium has been structured in the above-described manner, it is sufficient for the control unit 4 not to perform cost calculation of the nodes and links when searching for a destination route. Also, it is sufficient for the control unit 4 not to determine whether the nodes and links are an internal intersection, and not to perform processing to change the cost thereof.

Similarly, among the node costs and link costs recorded in the cost-data portion of the route data among the map data stored in the storage medium, for a link cost it is acceptable to record cost determined through ordinary cost calculation irrespectively of whether the link cost is an internal intersection, and, in substitution thereof, set and record a right-hand turn cost of a node entering an internal intersection, or a right-hand turn cost of a node leaving an internal intersection, at a cost lower than the cost determined through ordinary calculation. Alternatively, it is acceptable to set and record the cost of a link making up an internal intersection, the right-hand turn cost of a node entering an internal intersection, and the right-hand turn cost of a node leaving an internal intersection all at costs lower than the costs determined through ordinary cost calculation.

Further, the above-described embodiment describes application in a country or region where traffic flow is on the righthand side of the road. However, the embodiment can be similarly applied in an environment where traffic flow is on the lefthand side of the road.

What is claimed is:

1. A vehicle travel-route guidance apparatus, comprising:
    a map storage medium for storing map-related data and internal intersection information;
    a control unit that is operative to establish a destination route from a predetermined departure site to a predetermined destination based on said stored map-related data;
    means for determining whether said internal intersection information is provided during a destination route search by said control unit; and
    means for relatively changing an evaluation value of searched map-related data, if said internal intersection information is associated therewith, to preferentially include said searched map-related data in said destination route when said control unit searches for said destination route by an evaluation-value calculation.

2. The apparatus of claim 1, wherein said map-related data comprises link information.

3. The apparatus of claim 1, wherein said map-related data comprises node information.

4. The apparatus of claim 1, wherein said internal intersection information associated with said searched map-related data represents an intersection bypass turn.

5. The apparatus of claim 1, wherein said control unit is operative to perform a travel guidance operation based on said destination route search.

6. A travel-route guidance apparatus for vehicle use, comprising:
    storage means for storing map node, link and internal intersection information;
    a control unit that is operative to establish a destination route from a predetermined departure site to a predetermined destination via a cost evaluation of associated route link and node information, and via a subsequent route cost calculation that utilizes said cost evaluation,
    said control unit further being operative to determine whether any of said stored internal intersection information is associated with any of said route link or node information; and
    changing means for changing an evaluation value of route link or node information, having internal intersection information associated therewith, to provide preferential status for said route link or node information in said route cost calculation to establish said destination route.

7. The apparatus of claim 6, wherein said control unit is operative to perform travel guidance subsequent to establishment of said destination route.

8. The apparatus of claim 6, wherein said map link information represents an internal intersection for executing an intersection bypass turn associated therewith.

9. The apparatus of claim 6, wherein said changing means changes said evaluation value of said route link or node information, having associated internal intersection information, during said cost evaluation of said route link or node information.

10. The apparatus of claim 6, wherein said changing means changes the evaluation value of said route link or node information, having associated internal intersection information, subsequent to said cost evaluation of said route link or node information and during said route cost calculation.

11. The apparatus of claim 6, wherein said value changing means relatively changes an evaluation value of an internal intersection turn when said identification information is associated with said link or node information.

12. The apparatus of claim 6, wherein said value changing means relatively changes an evaluation value of an internal intersection exit point for leaving said internal intersection when said determining means determines that said identification information is associated with said link or node information.

13. A method of guiding a vehicle from a departure site to a destination, comprising the steps of:

establishing said departure site and said destination;

searching for a destination route between said departure site and said destination based on stored map-related data including node and link information;

determining whether internal intersection information is provided with searched map-related data; and changing an evaluation value of said searched map-related data, if said internal intersection information is associated therewith, to preferentially include said searched map-related data in said destination route.

14. The method of claim 13, further comprising the step of determining a destination route based on a route cost calculation that utilizes said evaluation value of said searched map-related data, and on evaluation values of other sets of searched map-related data.

15. The method of claim 14, wherein said step of changing comprises changing said evaluation value of said searched map-related data prior to said step of determining.

16. The method of claim 14, wherein said step of changing comprises changing said evaluation value of said searched map-related data during said step of determining.

* * * * *